United States Patent [19]

Berlin et al.

[11] 4,318,775
[45] Mar. 9, 1982

[54] METHOD OF FUEL CAN FAILURE LOCATION IN A NUCLEAR REACTOR AND ESPECIALLY A FAST REACTOR

[76] Inventors: Claude M. Berlin, Chemin de la Source, Quartier Saint Alban; Pierre M. Chantoin, No. 18, rue du Fenouil, both of 04100 Manosque, France

[21] Appl. No.: 17,844

[22] Filed: Mar. 6, 1979

[30] Foreign Application Priority Data

Mar. 10, 1978 [FR] France .................................. 78 07231

[51] Int. Cl.$^3$ ............................................ G21C 17/00
[52] U.S. Cl. .................................................... 376/253
[58] Field of Search .................................. 176/19 LD

[56] References Cited

U.S. PATENT DOCUMENTS

| | | | |
|---|---|---|---|
| 3,957,576 | 5/1976 | Boyer et al. | 176/19 LD |
| 3,959,069 | 5/1976 | McCormick | 176/19 LD |
| 4,033,813 | 7/1977 | Holt et al. | 176/19 LD |
| 4,080,250 | 3/1978 | Honekamp et al. | 176/19 LD |
| 4,135,970 | 1/1979 | Mitsutsuka et al. | 176/19 LD |

*Primary Examiner*—S. A. Cangialosi

[57] ABSTRACT

Fuel can failures are located by measuring the age of a faulty fuel element. The method consists in determining the ratio between two fission products constituted by two stable gaseous isotopes of xenon having different kinetics of formation of available gas as a function of the burn-up of the fuel elements.

1 Claim, 3 Drawing Figures

METHOD OF FUEL CAN FAILURE LOCATION IN A NUCLEAR REACTOR AND ESPECIALLY A FAST REACTOR

This invention relates to a method of fuel can failure location in a nuclear reactor. This method applies more especially but not exclusively to a fast reactor.

During operation of a reactor of this type, it is a known practice to carry out periodic monitoring of the activity of the coolant consisting of a liquid metal such as sodium and the activity of the blanket gas consisting of a neutral gas such as argon. An abrupt rise in activity of the blanket gas marks the appearance of a "gas leak" originating from at least on faulty can whilst an increase in delayed-neutron activity of the coolant indicates development of the "gas leak" to an "open rupture" which results in contact between the fuel material contained in the can and the coolant.

In the event of leakage, reactor operation is usually continued until the following programmed shutdown or else until a predetermined contamination threshold is reached.

In both of the above-mentioned cases of can failure, location of faulty fuel elements proves necessary.

The locating means to be employed differ according to the state of leakage, namely an "open rupture" or a "gas leak".

(I) Case of an "open rupture"

In this case, suitable location is obtained by first carrying out a pre-location by counting, at different points of the reactor vessel, the delayed neutrons emitted by the fission products such as the halogens bromine and iodine which are transported by the coolant. Location of the faulty fuel element is then carried out by means of a systematic scanning of the pre-located zone by means of a selector plug for analyzing the coolant derived from each fuel assembly (the "fuel assembly" will be considered in the following description as equivalent to a "fuel element").

(II) Case of a "gas leak"

There are at the present time a number of methods of location which can be employed either separately or in combination.

(1) The so-called "snifting" method: this method consists in analyzing the fission gases released from a leaky fuel element after this latter has been subjected to a variation in pressure and/or temperature.

This method has a disadvantage in that location is possible only at reactor shutdown.

(2) Location by analysis of the radioactive gas released from each fuel assembly.

This analysis is performed by means of an ionization chamber after degassing of the coolant.

This method calls for the installation of complicated mechanical means for cyclic sampling of the coolant discharged from each fuel assembly.

(3) Location by labeling of fuel assemblies: this method consists in labeling each assembly or a small group of assemblies with a tracer gas consisting of a mixture of stable xenon isotopes corresponding to an isotopically abnormal composition.

After occurrence of a can leak, the faulty assembly is identified by the specific tracer which has escaped into the blanket gas. A fraction of this latter is passed over activated charcoal which is cooled to a cryogenic temperature in order to adsorb the xenon isotopes, whereupon analysis is then performed by mass spectrometer.

This method suffers from the following disadvantages:

(a) its high cost;

(b) its limits of application in the following two cases:
 small leaks or pre-existent leaks at the time of fuel loading in the reactor;
 mixing of signals if there is more than one faulty fuel assembly;

(c) degradation of the labeling gas under the action of the radioactive flux.

(4) Measurement of age:

The method described in French Pat. No. 2,251,886 consists in measuring the ratio between two fission products consisting of the stable isotope $Xe^{134}$ and the radioactive isotope $Xe^{133}$. This ratio indicates the power and specific burn-up of the faulty fuel element.

In point of fact, experiments carried out by the present inventors have shown that the rate of emission of $Xe^{133}$ from the fuel is highly variable from one fuel element to the next, especially as a result of variations in fuel temperatures. For this reason, this method fails to offer a desirable guarantee of complete reliability, even when corrected by experimental reference curves established beforehand.

This inventon relates to a method which overcomes the disadvantages of the different methods mentioned above. More especially with respect to the method mentioned under (4) above, the invention makes it possible to remove the uncertainties which are inherent in the determination of the term $Xe^{133}$.

Said method is accordingly concerned with failed fuel can location in the case of fuel elements constituting a nuclear reactor core in which a fission reaction takes place, location being performed by measuring the age of the faulty fuel element. The method essentially consists in determining the ratio between two fission products constituted by two stable gaseous isotopes of Xenon having different kinetics of formation of available gas as a function of the specific burn-up of said fuel assemblies.

The aforementioned expression "formation of available gas" must be interpreted in accordance with the following explanation. This gas escapes from the fuel material after it has been produced and accumulates in at least one zone within the interior of the fuel element can. In a fast reactor, provision is made for at least one expansion chamber located at one end of the fuel element. After formation and release from the fuel material, the "available gas" will therefore accumulate within said expansion chamber and remain therein unless a rupture takes places within the fuel element can, in which case the gas will be permitted to escape from the can at the point of rupture, then to pass through the volume of liquid sodium into the inert blanket gas of the reactor in the case of fast reactors.

DETAILED DESCRIPTION OF INVENTION

Figure 1:
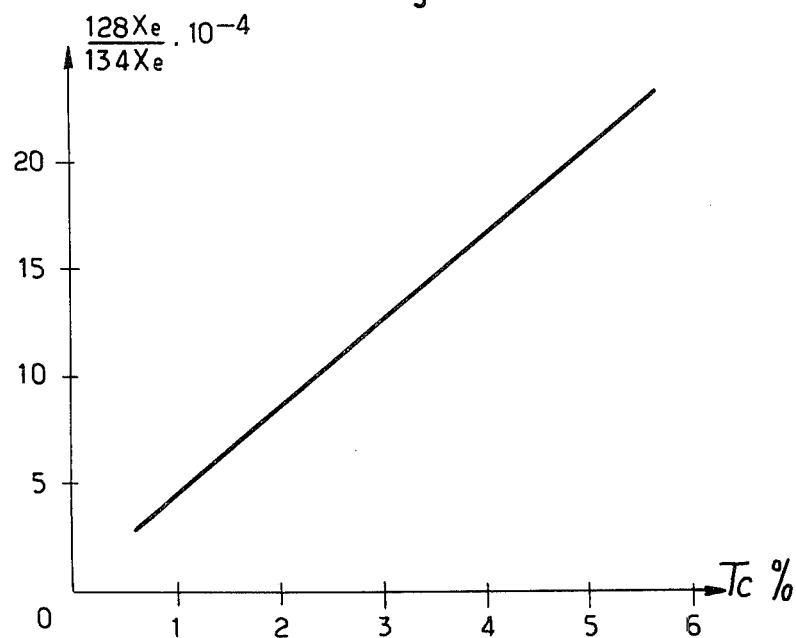
FIG. 1 is a plot of the ratio of $Xe^{128}$ to $Xe^{134}$ as a function of the mean burn-up in atoms percent.

The two stable isotopes mentioned above advantageously belong to a first group which comprises $Xe^{128}$ and $Xe^{130}$ and to a second group which comprises $Xe^{131}$, $Xe^{132}$, $Xe^{134}$, $Xe^{136}$.

It has been discovered in accordance with the present invention that, in the case of the isotopes $Xe^{128}$, $Xe^{130}$, $Xe^{131}$, $Xe^{132}$, $Xe^{134}$, $Xe^{136}$, the progressive variation of the quantity of available gas as a function of burn-up could be expressed by an equation of the form $$V \text{ in cm}^3 = a(Tc)^n$$

where V is the volume of available gas and Tc is the mean burn-up.

The values of the constants a and n depend on the percentage of uranium and/or plutonium contained in the fuel material and on the neutron spectrum within the reactor. In the case of the Phenix reactor (a detailed description of this fast reactor can be found in the journal entitled "Energie Nucléaire", Volume 13, No. 3, pages 167 to 256, May-June, 1971) the values are as indicated in the following table:

| Isotope | a | n |
|---|---|---|
| $Xe^{128}$ | 0.0016 | 2.62 |
| $Xe^{130}$ | 0.0048 | 2.53 |
| $Xe^{131}$ | 1.92 | 1.62 |
| $Xe^{132}$ | 2.76 | 1.64 |
| $Xe^{134}$ | 3.57 | 1.67 |
| $Xe^{136}$ | 3.25 | 1.66 |

A study of the values of n shows that, from the point of view of degassing kinetics, two groups of isotopes can be distinguished:

on the one hand isotopes having a relatively faster emission in which: $n \sim 2.5$;

on the other hand isotopes having a relatively slower emission in which: $n \sim 1.65$.

This means that, if consideration is given to the ratio of two isotopes belonging to each of the two groups, the progressive variation of this ratio will be defined by the equation:

$$R = V_1/V_2 = a_1/a_2 \, (Tc)^{n_1 - n_2}$$

where the indices 1 and 2 clearly correspond to each of the two isotopes.

With the values indicated above, we have: $n_1 - n_2 = \sim 0.85$ and the equation of variation of the ratio has the following approximate general form:

$$R = K \, (Tc) \, 0.85$$

There is therefore a one-to-one correspondence between the ratio R and the mean burn-up.

In consequence, R indicates the age of the fuel element.

The determination of said ratio R in the first fission gas emissions from a failed fuel can can therefore make it possible to determine the burn-up of the faulty fuel element and consequently to give an indication for the purpose of location of a can failure.

The method can be applied by determining the ratio R between two isotopes selected respectively from a first group comprising $Xe^{128}$ and $Xe^{130}$ and from a second group consisting $Xe^{131}$, $Xe^{132}$, $Xe^{134}$, $Xe^{136}$.

In practice, the method will be all the more reliable and easy to utilize when:

the emission kinetics of the two isotopes are different, the cross-sections of the two isotopes and their law of formation are stable irrespective of the position of the fuel element within the reactor, the quantities of isotopes produced are large and therefore readily measurable.

As a function of these criteria, it appears an advantage to select the ratios $Xe^{128}/Xe^{134}$ and $Xe^{130}/Xe^{134}$ in which the equations of progressive variation are as follows:

$$Xe^{128}/Xe^{134} = 0.000448 \, (Tc)^{0.95}$$

$$Xe^{130}/Xe^{134} = 0.00134 \, (Tc)^{0.86}$$

These equations show that the progressive variation of this ratio is approximately proportional to the mean burn-up.

Figure 2:
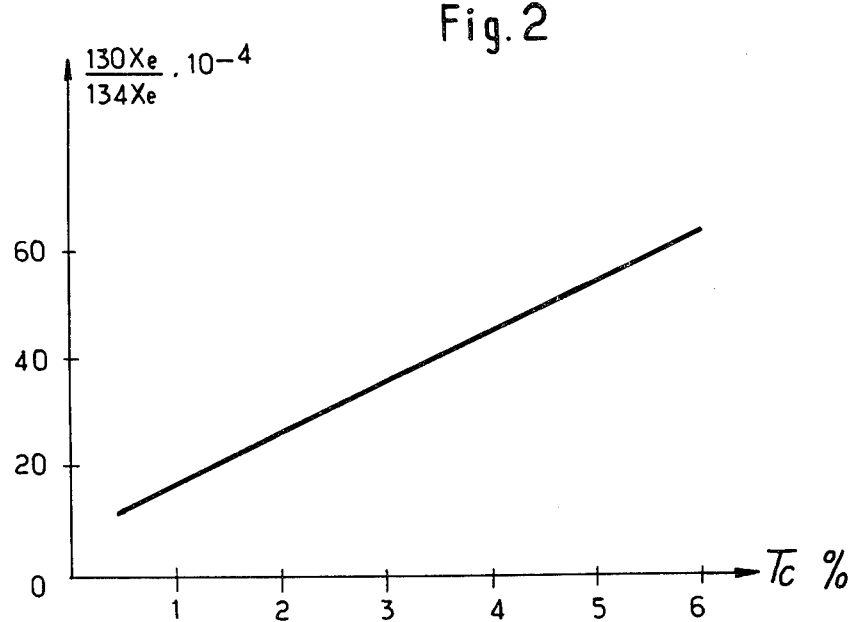
FIG. 2 is a plot of the ratio of $Xe^{130}$ to $Xe^{134}$ as a function of the mean burn-up in atoms percent.

There have been shown respectively in FIGS. 1 and 2 the curves which give the progressive variation of the two aforementioned ratios as a function of the mean burn-up in atoms per cent. These curves in the form of sloping straight lines have been plotted experimentally from fuel elements irradiated in the Phenix reactor.

It is of interest to note the high slope of these straight lines since this permits a high degree of accuracy in determination of the age.

Figure 3:
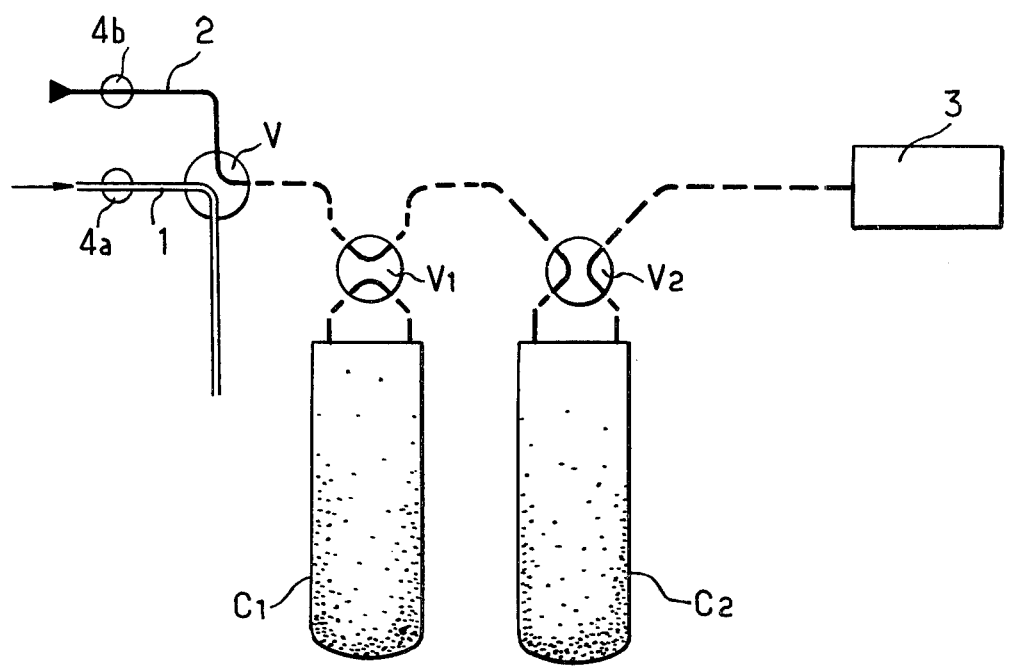
FIG. 3 is a diagrammatic showing of a device for the practical application of the method of the invention.

By way of constructional example which is given without any implied limitation, FIG. 3 shows very diagrammatically a device for the practical application of the method according to the invention.

Said device comprises a circuit 1 for sampling the gas to be analyzed, the gas being constituted by a mixture of argon and fission products.

Said circuit 1 terminates in a four-way valve v which serves to direct the gas into one of the two columns $C_1$ or $C_2$. Each column is filled with active charcoal and is equipped with a four-way valve $v_1$ or $v_2$. Each column has a double-walled casing (not shown in the figure) in which liquid nitrogen can be circulated and also with a reheating circuit (not shown) formed by means of a resistor wound around the column. Either of the two columns is employed first in alternate sequence, for example the column $C_2$ shown in FIG. 3 in the desorption position. The fission products containing the two xenon isotopes whose ratio is to be measured are first subjected to adsorption of charcoal at a temperature of approximately $-170°$ C. The temperature of the column is then brought to approximately 150° C. at a programmed heating rate while at the same time sweeping with a flow of helium from the pipe 2 in order to desorb the fission products which have previously been adsorbed. The gas flow is directed into the mass spectrometer 3 which performs the measurement. Flowmeters 4a and 4b serve to measure respectively the flow rate of the gas to be analyzed and the helium flow rate. Automation of the different sequences of operation of valves, of measurement by the mass spectrometer and of publication of results is ensured by means of a computer (not shown in the figure). This device makes it possible to perform the measurement in the mass spectrometer on a sample which has been concentrated in xenon isotopes to a value of the order of one thousand times.

This particular mode of operation corresponds to the case of fast reactors in which the fuel element coolant is a liquid metal (liquid sodium, for example), an inert blanket gas usually consisting of argon being present above this latter. Sampling is performed in the blanket gas. However, it is clear to anyone versed in the art that, even in the case of other types of nuclear reactor, a sample of any fission gases which may be present in the coolant may be taken by degassing.

The method in accordance with the invention makes it possible to locate a faulty fuel element from the initial stages of "gas leakage".

As will be readily understood, the invention is not limited to the constructional examples which have been more especially described and illustrated in the accompanying drawings but extends on the contrary to all alternative forms. It should be indicated in particular that location can be performed not only on the basis of a single ratio of two isotopes but of two ratios involving at least three different isotopes.

We claim:

1. A method of fuel can failure location in the case of fuel elements constituting a nuclear reactor core in which a fission reaction takes place, location being performed by measuring the age of the faulty fuel element, wherein said method consists in determining the ratio between two fission products constituted by two stable gaseous isotopes of xenon having different kinetics of formation of available gas as a function of the specific burn-up of said fuel assemblies, one of the stable gaseous isotopes being selected from a first group consisting of $Xe^{128}$ and $Xe^{130}$, and the other of the stable gaseous isotopes being selected from a second group consisting of $Xe^{131}$, $Xe^{132}$, $Xe^{134}$ and $Xe^{136}$.

* * * * *